(12) United States Patent
Peret

(10) Patent No.: US 9,413,150 B2
(45) Date of Patent: Aug. 9, 2016

(54) LOCKING MECHANISM FOR CONTROL BOX

(71) Applicant: Eaton Corporation, Cleveland, OH (US)

(72) Inventor: Scot Francis Peret, Jackson, WI (US)

(73) Assignee: Eaton Corporation, Cleveland, OH (US)

( * ) Notice: Subject to any disclaimer, the term of this patent is extended or adjusted under 35 U.S.C. 154(b) by 16 days.

(21) Appl. No.: 14/315,848

(22) Filed: Jun. 26, 2014

(65) Prior Publication Data

US 2015/0380914 A1   Dec. 31, 2015

(51) Int. Cl.
  *A47B 81/00* (2006.01)
  *H02G 3/14* (2006.01)
  *H02G 3/08* (2006.01)

(52) U.S. Cl.
  CPC ... *H02G 3/14* (2013.01); *H02G 3/08* (2013.01)

(58) Field of Classification Search
  CPC ........... H02G 3/14; H02G 3/08; H02G 3/081; E05C 5/04
  USPC ........................................................ 292/251
  See application file for complete search history.

(56) References Cited

U.S. PATENT DOCUMENTS

| | | | |
|---|---|---|---|
| 5,430,248 A | 7/1995 | Levy | |
| 5,690,460 A * | 11/1997 | Attanasio | F16B 5/10 411/551 |
| 6,007,353 A | 12/1999 | Webster | |
| 6,016,102 A | 1/2000 | Fortune et al. | |
| 6,279,754 B1 * | 8/2001 | Hoss | H05K 7/1425 211/182 |
| 6,357,804 B1 | 3/2002 | Bernier et al. | |
| 7,207,758 B2 * | 4/2007 | Leon | F16B 21/02 411/45 |
| 7,259,959 B2 * | 8/2007 | Tu | G06F 1/187 248/694 |
| 7,378,591 B2 * | 5/2008 | Dinh | H02G 3/086 174/50 |
| 7,850,260 B2 * | 12/2010 | Figueroa | G06F 11/30 312/223.2 |
| 7,874,779 B2 * | 1/2011 | Csik | F16B 5/0208 411/553 |
| 7,878,919 B2 * | 2/2011 | Perry | A63B 53/0466 473/288 |
| 7,997,843 B2 * | 8/2011 | Bowers | F16B 21/04 24/663 |
| 8,702,184 B2 | 4/2014 | Lakoduk et al. | |
| 2002/0071243 A1 | 6/2002 | Krispin | |
| 2002/0152781 A1 | 10/2002 | Teskey | |
| 2004/0094318 A1 | 5/2004 | Koessler | |
| 2011/0304247 A1 * | 12/2011 | Yan | H05K 7/1489 312/223.2 |

* cited by examiner

*Primary Examiner* — Hanh V Tran
(74) *Attorney, Agent, or Firm* — Ziolkowski Patent Solutions Group, SC

(57) ABSTRACT

A control box cover assembly is provided that includes a plurality of side panels, a front panel selectively coupled to the plurality of side panels, and a latch coupled to a side panel and extending outwards therefrom, with the latch having an opening formed therein having a first direction longer than a second direction. The control box cover assembly also includes a fastener positioned within the opening, with the fastener further including a shaft having a first end and a second end, a head coupled to the first end, and a protrusion extending radially outwards from the shaft proximal the second end. The protrusion is configured to hold the fastener within the opening when the protrusion is aligned with the second direction and release the fastener from the opening when the protrusion is aligned with the first direction.

20 Claims, 5 Drawing Sheets

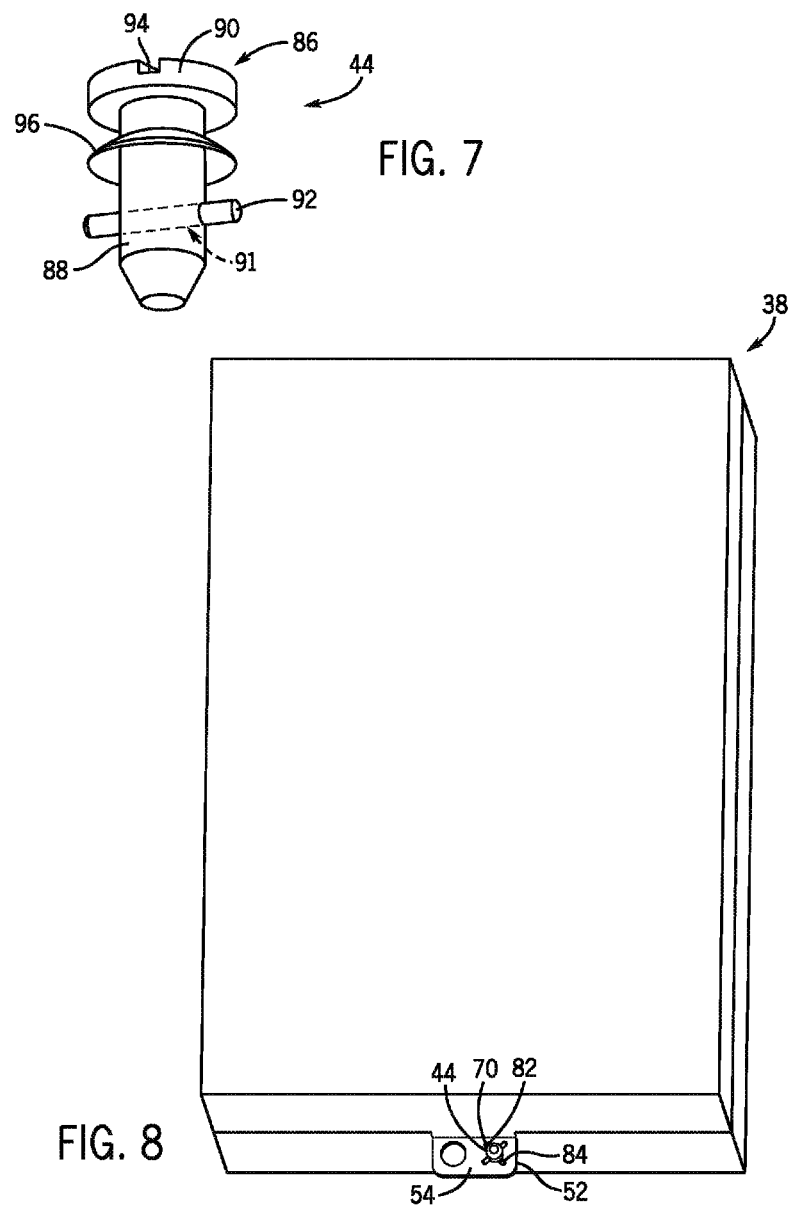

LOCKING MECHANISM FOR CONTROL BOX

BACKGROUND OF THE INVENTION

Embodiments of the invention relate generally to electrical enclosures, and more particularly, to an apparatus and method of providing a locking mechanism for a cover to an electrical box that houses electronic equipment.

Enclosures for electrical equipment provide protection to the equipment from environmental conditions and prevent electrical shock to equipment users. The National Electrical Manufacturing Association (NEMA) publishes performance standards that different classes of electrical enclosures are to offer against environmental conditions and intrusion by foreign substances. NEMA standards specify construction requirements and testing criteria for enclosures and provide guidance on security of doors and covers to ensure the appropriate level of protection to electrical equipment and operators. An enclosure manufacturer will stipulate a NEMA rating and thereby claim a degree of protection for the enclosed electronic components against environmental hazards such as water, dust, icing, corrosives, acids, oil, and intrusion by people or animals.

Specific NEMA enclosure "Types" are specified for their appropriate applications and the environmental conditions against which they are designed to provide protection. For instance, basic NEMA enclosure applications for indoor non-hazardous use include protecting operators against accidental contact with enclosed equipment and preventing ingress of solid foreign objects such as falling dirt. Some NEMA enclosures provide further protection against ingress of dripping water and water from light splashing. Other NEMA enclosures are constructed for outdoor use and may be intended for applications in areas were rain, sleet, and the external formation of ice on the enclosure may be present. Still, other NEMA enclosures are constructed to protect against rain, hose-directed water, windblown dust, and more. To offer a degree of protection against tampering, some NEMA Types require a tool to gain access to the interior or require provisions for locking the enclosure.

FIGS. 1 and 2 show a prior art electrical enclosure 20 having an electrical box 22, an enclosure cover 24, and a locking provision to lock the enclosure cover 24 on the electrical box 22. The locking provision includes a front latch 26 on the enclosure cover 24 and a back latch 28 on the electrical box 22. The latches 26, 28 have a provision for a padlock and a provision for a lock rivet 30 to fasten the enclosure cover 24 to the electrical box 22. FIG. 3 shows a lock rivet 30 installed in a hole through the front latch 26 of the enclosure cover 24. The lock rivet 30 has a shaft 32 with a head 34 at one end and a hole through the shaft 32 at the other end through which a pin 36 is inserted. The lock rivet 30 is held in the front latch 26 permanently by the head 34 and pin 36. The back latch 28 of the electrical box 22 has an opening configured to receive the lock rivet 30 when the pin 36 is oriented in a certain direction and then retain it when the pin 36 is rotated to another direction.

With respect to the lock rivet 30, a machine riveting process is typically used to assemble the lock rivet 30 within the hole of the front latch 26. The machine riveting process requires an operator to load the enclosure cover 24 on the riveting machine, insert a pin 36 in an actuating arm of the machine, install a rivet through a hole in the front latch 26 of the enclosure cover 24, orient the rivet so that a hole in the rivet is positioned to receive the pin 36 from the machine, and then actuate the machine to drive the pin 36 into the rivet. Unfortunately, the machine riveting process leads to significant failure rates (e.g., 2 in every 10 parts) because jamming often destroys component parts during the machine actuation process. In addition, the machine riveting process leads to expenses in housing and operating the machine and in replacing failed parts. Also, the machine riveting process may pinch extremities or propel broken assembly parts at the operator at high speeds due to high compression forces of the machine.

It would therefore be desirable to design an apparatus and method to provide a locking mechanism for an electrical component enclosure that eliminates machine riveting and the associated failure rate, expense, and potential for injury.

BRIEF DESCRIPTION OF THE INVENTION

The invention is a directed method and apparatus for providing a locking mechanism for a cover to an electrical box that houses electronic equipment.

In accordance with one aspect of the invention, a control box cover assembly includes a plurality of side panels, a front panel selectively coupled to the plurality of side panels, and a latch coupled to a side panel and extending outwards therefrom, the latch having an opening formed therein, the opening having a first direction longer than a second direction. The control box cover assembly also includes a fastener positioned within the opening, with the fastener further including a shaft having a first end and a second end, a head coupled to the first end, and a protrusion extending radially outwards from the shaft proximal the second end, the protrusion configured to hold the fastener within the opening when the protrusion is aligned with the second direction and release the fastener from the opening when the protrusion is aligned with the first direction.

In accordance with another aspect of the invention, a method of fabricating a locking mechanism for a control box includes providing a control box cover comprising a front panel coupled to a plurality of side panels with a bracket coupled to a respective side panel and extending outwards therefrom, piercing an opening through the bracket, the opening having a first direction longer than a second direction, and providing a fastener including a shaft having a first end and a second end, a head coupled to the first end, and a protrusion extending radially outwards from the shaft proximal the second end, the protrusion configured to hold the fastener within the opening when the protrusion is aligned with the second direction and release the fastener from the opening when the protrusion is aligned with the first direction. The method also includes aligning the protrusion of the fastener with the first direction of the opening and inserting the fastener into the opening while the protrusion of the fastener is aligned with the first direction of the opening.

In accordance with yet another aspect of the invention, an electrical enclosure includes an enclosure box for receiving electrical components therein and having a bracket extending outwards therefrom, a front cover securable to the enclosure box and having a bracket alignable with the bracket of the enclosure box, and an opening formed in each of the brackets of the enclosure box and front cover, each opening comprising a circular opening having a notched aperture formed on one side thereof that extends outwards from the circular opening. The electrical enclosure also includes a locking rivet assembly coupling the bracket of the front cover to the bracket of the enclosure box, the locking rivet assembly being insertable into the openings of the brackets when aligned with the notched apertures of the openings.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 7 is a perspective view of a fastener assembly of the control box of FIG. 4, according to an embodiment of the invention.

FIG. 8 is a back perspective view of a control box having a locking mechanism, according to an embodiment of the invention.

DETAILED DESCRIPTION

The operating environment of the invention is described with respect to an electrical enclosure for control components of an electrical distribution system. However, one skilled in the art will further appreciate that the invention is equally applicable for use with other enclosures. In addition, the operating environment is also described in terms of enclosures designed to protect internal components from environmental conditions and to protect people and animals from exposure to internal components. However, one skilled in the art will further appreciate that the invention is equally applicable for other purposes. Further, one skilled in the art will readily appreciate that the invention is not limited to applications involving enclosures.

Figure 4:
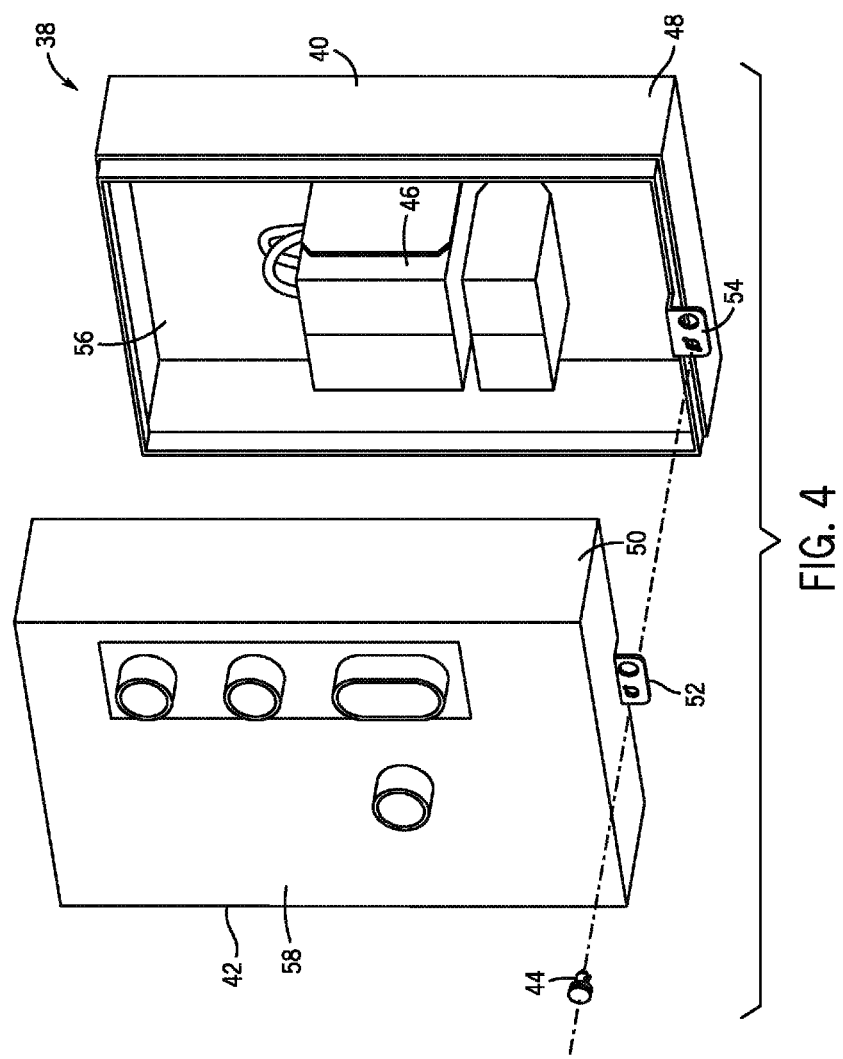
FIG. 4 is an exploded perspective view of a control box having a locking mechanism showing a control box with a back latch, a front cover with a front latch, and a fastener assembly, according to an embodiment of the invention.

FIG. 4 shows an exploded view of an electrical enclosure 38 including an electrical box 40, a front cover 42, a fastener assembly 44, and electrical components 46 mounted within the electrical box 40, according to an embodiment of the invention. The electrical box 40 has a plurality of sidewalls 48 and the front cover 42 has a plurality of sidewalls 50 that form corresponding perimeters of generally the same size. However, the sidewalls 48 of the electrical box 40 have recessed edges that receive the perimeter of the front cover 42 when the electrical box 40 is covered. In other embodiments, the front cover 42 may be connected to the electrical box 40 by a plurality of hinges (not shown). A front bracket 52 is connected to a sidewall 50 at the bottom of the front cover 42 and a back bracket 54 is connected to a sidewall 48 at the bottom of the electrical box 40. Each bracket 52, 54 is configured to receive the fastener assembly 44 so that the fastener assembly 44 may lock the front cover 42 onto the electrical box 40. The front cover 42 and electrical box 40 protect the electrical components 46 from environmental conditions and protect operators from electrical shock. In one embodiment, the electrical enclosure 38 meets the standards for a NEMA enclosure Type. In one embodiment, the electrical enclosure 38 is a NEMA Type 1, Type 2, Type 3, or Type 4 enclosure.

The electrical box 40 includes a back panel 56 for mounting the electrical components 46 and the back panel 56 may be coupled to the respective plurality of sidewalls 48. The back bracket 54 extends outward from a sidewall 48 at the bottom of the electrical box 40. The front cover 42 has a front panel 58 that may be coupled to a respective plurality of sidewalls 50. The front bracket 52 extends outward from a sidewall 50 at the bottom of the front cover 42. In other embodiments, both brackets 52, 54 may be coupled to a different respective pair of sidewalls 48, 50. The front bracket 52 aligns with the back bracket 54 when the front cover 42 closes on the electrical box 40. Both brackets 52, 54 have an opening configured to receive the fastener assembly 44 so that the fastener assembly 44 couples the front bracket 52 to the back bracket 54 and locks the front cover 42 on the electrical box 40.

Figure 1:
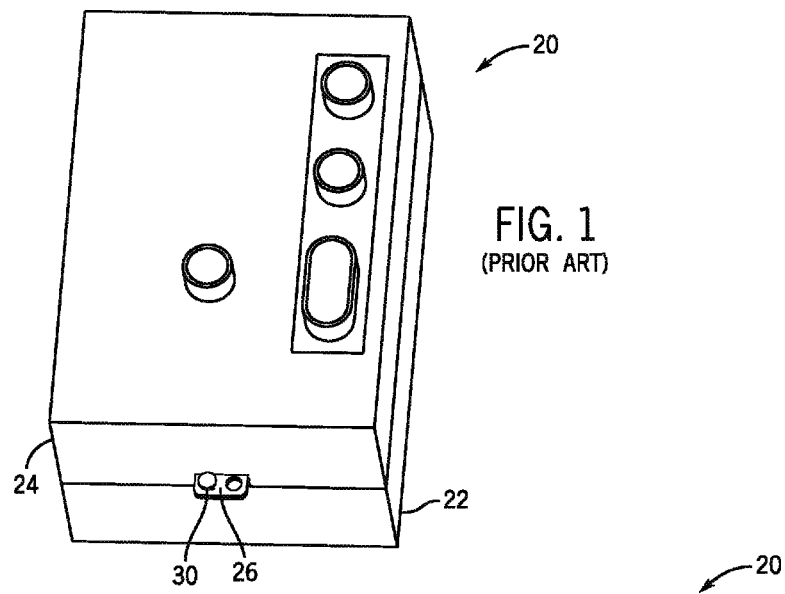
FIG. 1 is a front perspective view of a prior art control box.
Figure 2:
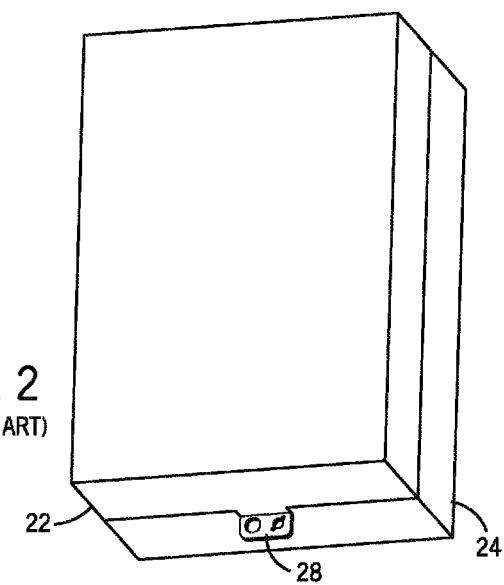
FIG. 2 is a back perspective view of a prior art control box.
Figure 3:
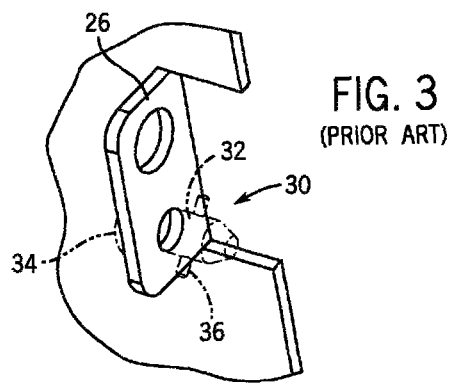
FIG. 3 is a perspective view of a front latch and fastener assembly of the prior art control box of FIGS. 1 and 2.
Figure 5:
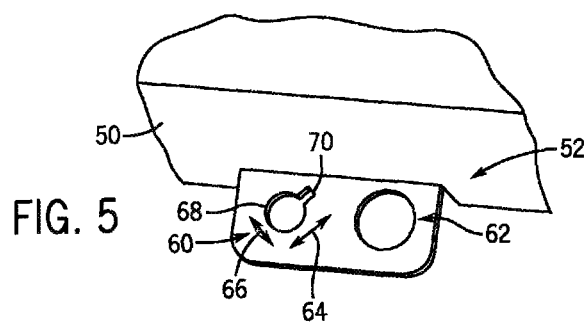
FIG. 5 is a perspective view of a front latch of the control box of FIG. 4, according to an embodiment of the invention.

Referring now to FIG. 5, the front bracket 52 has a first opening 60 and a second opening 62 formed through the bracket 52. The first opening 60 has a first direction 64 longer than a second direction 66 and the second opening 62 is circular. In one embodiment, the first opening 60 has a circular hole 68 and a notched aperture 70 extending outwards from the circular hole 68 in one direction. The first direction 64 of the first opening 60 corresponds to the direction of the notched aperture 70 and has a length equal to the diameter of the circular hole 68 plus the length of the notched aperture 70. The second direction 66 of the first opening 60 corresponds to a direction other than that of the notched aperture 70 and has a length equal to the diameter of the circular hole 68. In one embodiment, the notched aperture 70 is positioned at a 45 degree angle to the respective sidewall 50 that is coupled to the front bracket 52. In another embodiment, the notched aperture 70 is positioned toward the respective sidewall 50 that is coupled to the front bracket 52.

Figure 6:
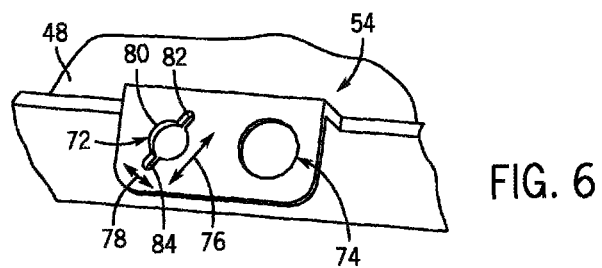
FIG. 6 is a perspective view of a back latch of the control box of FIG. 4, according to an embodiment of the invention.

Referring now to FIG. 6, the back bracket 54 has a first opening 72 and a second opening 74 formed through the bracket 54. The first opening 72 has a first direction 76 longer than a second direction 78 and the second opening 74 is circular. In one embodiment, the first opening 72 has a circular hole 80 and a first notched aperture 82 extending outwards from the circular hole 80 in one direction and a second notched aperture 84 extending outwards from the circular hole 80 in a direction opposite the first notched aperture 82. The first direction 76 of the first opening 72 corresponds to the direction of the first notched aperture 82 and second notched aperture 84 and has a length equal to the diameter of the circular hole 80 plus the length of the two notched apertures 82, 84. The second direction 78 of the first opening 72 corresponds to a direction other than that of the notched apertures 82, 84 and has a length equal to the diameter of the circular hole 80. In one embodiment, the first notched aperture 82 is positioned at a 45 degree angle to the respective sidewall 48 that is coupled to the back bracket 54.

The first openings 60, 72 of each of the brackets 52, 54 are configured to receive the fastener assembly 44, which is further discussed below in regard to FIG. 7. One skilled in the art would recognize that the geometry of the first openings 60, 72 may be varied from that discussed above while remaining in a configuration to receive a respective fastener assembly in accordance with the invention. In one embodiment, one or both of the first openings 60, 72 is a slot. In another embodiment, one or both of the first openings 60, 72 have a circular hole with a slot extending outwards from the circular hole. In another embodiment, the first openings 60, 72 may have a different number of notched apertures or slots extending outwards from a hole than in the embodiment disclosed above. The second openings 62, 74 of each of the brackets 52, 54 are configured to receive an additional fastener assembly or lock to provide additional security to the enclosure. In one embodiment, a padlock (not shown) is installed in the second openings 62, 74.

In one embodiment, one or both of the brackets 52, 54 are formed integral with a respective sidewall 48, 50. For instance, a bracket 52, 54 may comprise a tab cut into a sidewall 48, 50 and angled so that it extends outwards from the respective front cover 42 or electrical box 40. In other embodiments, each bracket 52, 54 may be coupled to the respective sidewall 48, 50 via a fastener, welding, adhesive, or another well known method. One or both of the brackets 52, 54 may extend outward from the respective sidewall 48, 50 at substantially a right angle. In one embodiment, the front cover 42 or electrical box 40 may not have a plurality of sidewalls 48, 50 and the respective bracket 52, 54 may be coupled directly to the front panel 58 or back panel 56. In one embodiment, an electrical enclosure may have multiple locking mechanisms.

Referring now to FIG. 7, the fastener assembly 44 is shown in greater detail. The fastener assembly 44 is configured to couple the front bracket 52 to the back bracket 54 and thereby lock the front cover 42 on the electrical box 40. In one embodiment, the fastener assembly 44 includes a rivet 86 having a shaft 88 with a head 90 at one end and an opening 91 (shown in phantom) provided through the shaft 88 proximal the other end. The rivet 86 may be a locking rivet and may be a quarter-turn locking rivet. In one embodiment, the opening 91 in the shaft 88 is a pierced hole having a 0.210 inch diameter. While one embodiment uses a rivet 86 in the fastener assembly 44, it is recognized that other suitable fasteners may be used in the fastener assembly 44.

The fastener assembly 44 also includes a pin 92 that is inserted through the opening 91 provided in rivet shaft 88 and so as to extend radially outwards from the shaft 88. In one embodiment, the pin 92 has a first end extending outwards beyond the shaft 88 in a first direction and a second end extending outwards beyond the shaft 88 in a second direction. In one embodiment, the first and second ends of the pin 92 may extend outwards from the shaft 88 substantially to the outer circumference of the fastener head 90. In another embodiment, the pin 92 may have only one end that extends outwards from the shaft 88 while the other end is positioned within the opening of the shaft 88. The pin 92 may be a spring pin, such as a 3/32 inch diameter spring pin, for example. While one embodiment contemplates inserting a pin 92 through an opening in the shaft 88, one skilled in the art would recognize that other types of protrusions may extend outwards from the shaft 88 and, depending on the protrusion used, an opening through the shaft 88 may not be required.

The head 90 of the rivet 86 may have a screw drive configuration so that a corresponding tool can be used to turn the fastener. Many types of screw drives may be used including a slot, phillips, pozidrive, square, robertson, hex, hex socket, security hex socket, 6lobe, pin-in 6lobe, tri-wing, torq-set, spanner head, double-square, triple square, polydrive, one-way, spline drive, double hex, or a Bristol configuration. In the embodiment of FIG. 7, a slot 94 extends across a surface of the head 90 and may be configured for operation with a flat-head screwdriver. The end of the rivet 86 opposite the head 90 may have a tapered end which may aid in inserting the rivet 86 into a respective opening.

As further shown in FIG. 7, the fastener assembly 44 may have a washer 96 installed on the rivet shaft 88 between the head 90 and the pin 92. When the fastener assembly 44 is installed on the front cover 42, the washer 96 may be positioned between the fastener head 90 and the front bracket 52. The washer 96 may comprise a wave washer, Belleville washer, or split washer to create a spring pressure to hold the fastener in the locked position. The back bracket 54 (FIG. 6) may have one or two ramps beginning proximal a notched aperture 82, 84 and extending around a portion of the circular hole 80, such that—upon rotating the rivet 86—the pin 92 is pulled up the ramp and the spring force of the washer 96 is engaged.

For inserting the fastener assembly 44 into the first opening 60 of the front bracket 52 and first opening 72 of the back bracket 54, the pin 92 is aligned with the notched aperture 70 in the front bracket 52 and the first notched aperture 82 in the back bracket 54. The fastener assembly 44 may then be tilted toward the notched aperture 70 of the front bracket 52 in order for the end of the pin 92 opposite the notched aperture 70 to clear the circular hole 68 of the front bracket 52. Upon insertion of the fastener assembly into the first opening 72 of the back bracket 54, the fastener assembly 44 is rotated so that the pin 92 is askew from the notched apertures 70, 82, 84, so as to secure the brackets 52, 54 together.

Referring now to FIG. 8, an electrical enclosure 38 having a locking mechanism is shown from a back view perspective. The locking mechanism has a fastener assembly 44 in a locked position where the fastener assembly 44 is turned one quarter turn from the notched apertures 82, 84 in the back bracket 54. The single notched aperture 70 of the front bracket 52 is located beyond the first (upper) notched aperture 82 of the back bracket 54, while the front bracket 52 is visible through the second (lower) notched aperture 84 of the back bracket 54. In another embodiment, the notched aperture 70 of the front bracket 52 is askew from the first notched aperture 82 of the back bracket 54.

Figure 9:
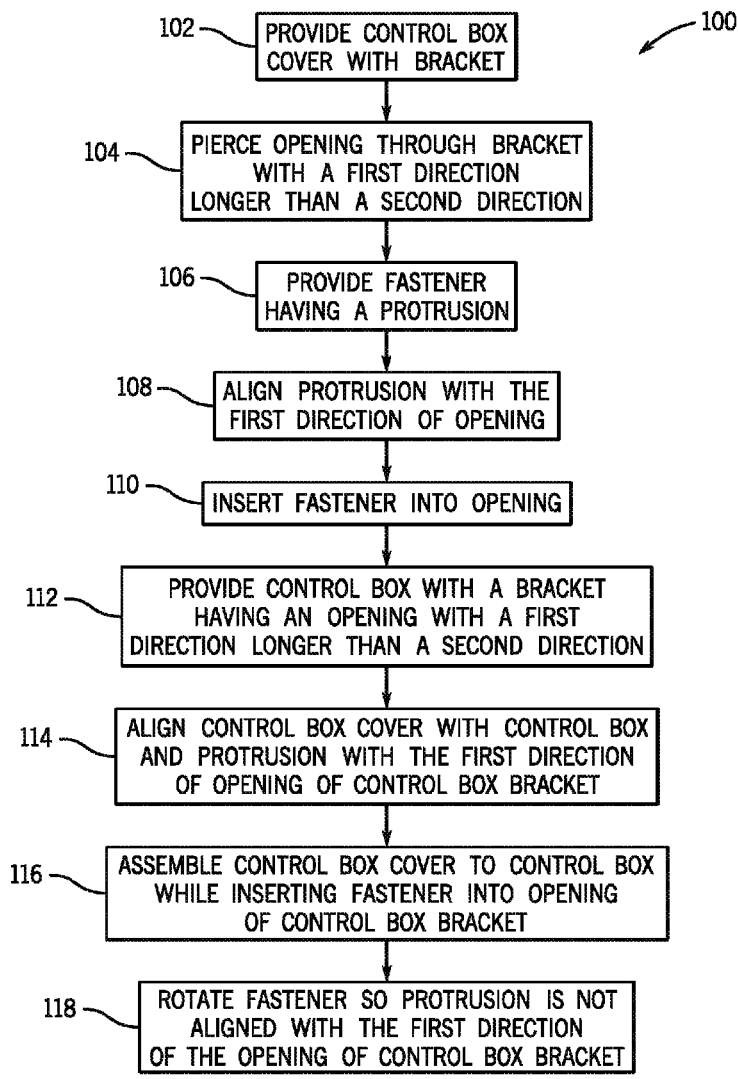
FIG. 9 is a flow chart showing steps in fabricating a locking mechanism for a control box, according to an embodiment of the invention.

Referring now to FIG. 9, and with continued reference back to FIGS. 4-8, a method of fabricating a locking mechanism for an electrical enclosure is shown, according to an embodiment of the invention. The process 100 begins by providing an electrical box front cover 42 at STEP 102. The front cover 42 may include a front panel 58 coupled to a plurality of sidewalls 50. A front bracket 52 may be coupled to a bottom sidewall and may extend outwards from the front cover 42. The process 100 continues with the formation of a first opening 60 in the front bracket 52 at STEP 104, with the opening being formed by piercing an opening through the front bracket 52 that has a first direction 64 longer than a second direction 66. A stamping press may be used to stamp the opening in the front bracket 52, with the stamping press having a die configured according to the desired geometry of the first opening 60. Next, a fastener assembly 44 is provided having a protrusion extending radially outwards from a fastener at STEP 106. The protrusion of the fastener is aligned with the first direction 64 of the first opening 60 at STEP 108, and the fastener assembly 44 is then inserted into the first opening 60 while the protrusion of the fastener is aligned with the first direction 64 of the first opening 60 at STEP 110.

The process 100 continues at STEP 112 by providing an electrical box 40—with the electrical box 40 including a back panel 56 coupled to a plurality of sidewalls 48. A back bracket 54 may be coupled to the bottom sidewall and may extend outwards from the electrical box 40. The back bracket 54 has a first opening 72 formed through the bracket, and the first opening 72 has a first direction 76 longer than a second direction 78. The electrical box front cover 42 is then positioned on the electrical box 40 at STEP 114 so that respective brackets 52, 54 are flush with each other and the respective first openings 60, 72 are aligned. Also in STEP 114, the protrusion of the fastener is aligned with the first direction 76 of the first opening 72 of the back bracket 54. Next, the front cover 42 is assembled on the electrical box 40 as the fastener assembly 44 is inserted into the first opening 72 of the back bracket 54 at STEP 116. The process 100 continues at STEP 118, where the fastener is rotated such that the protrusion of the fastener is not aligned with the first direction 76 of the first opening 72 of the back bracket 54 so as to couple the front cover 42 on the electrical box 40.

Beneficially, embodiments of the invention thus provide an apparatus and method to provide a locking mechanism for an electrical component enclosure that eliminates machine riveting and the associated failure rate, expense, and potential for injury.

According to one embodiment of the invention, a control box cover assembly includes a plurality of side panels, a front panel selectively coupled to the plurality of side panels, and a latch coupled to a side panel and extending outwards therefrom, the latch having an opening formed therein, the opening having a first direction longer than a second direction. The control box cover assembly also includes a fastener positioned within the opening, with the fastener further including a shaft having a first end and a second end, a head coupled to the first end, and a protrusion extending radially outwards from the shaft proximal the second end, the protrusion configured to hold the fastener within the opening when the protrusion is aligned with the second direction and release the fastener from the opening when the protrusion is aligned with the first direction.

According to another embodiment of the invention, a method of fabricating a locking mechanism for a control box includes providing a control box cover comprising a front panel coupled to a plurality of side panels with a bracket coupled to a respective side panel and extending outwards therefrom, piercing an opening through the bracket, the opening having a first direction longer than a second direction, and providing a fastener including a shaft having a first end and a second end, a head coupled to the first end, and a protrusion extending radially outwards from the shaft proximal the second end, the protrusion configured to hold the fastener within the opening when the protrusion is aligned with the second direction and release the fastener from the opening when the protrusion is aligned with the first direction. The method also includes aligning the protrusion of the fastener with the first direction of the opening and inserting the fastener into the opening while the protrusion of the fastener is aligned with the first direction of the opening.

According to yet another embodiment of the invention, an electrical enclosure includes an enclosure box for receiving electrical components therein and having a bracket extending outwards therefrom, a front cover securable to the enclosure box and having a bracket alignable with the bracket of the enclosure box, and an opening formed in each of the brackets of the enclosure box and front cover, each opening comprising a circular opening having a notched aperture formed on one side thereof that extends outwards from the circular opening. The electrical enclosure also includes a locking rivet assembly coupling the bracket of the front cover to the bracket of the enclosure box, the locking rivet assembly being insertable into the openings of the brackets when aligned with the notched apertures of the openings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control box cover assembly comprising:
   a plurality of side panels;
   a front panel selectively coupled to the plurality of side panels;
   a latch coupled to a side panel and extending outwards therefrom, the latch having an opening formed therein, the opening having a first direction longer than a second direction; and
   a fastener positioned within the opening, the fastener comprising:
      a shaft having a first end and a second end;
      a head coupled to the first end; and
      a protrusion extending radially outwards from the shaft proximal the second end, the protrusion configured to hold the fastener within the opening when the protrusion is aligned with the second direction and release the fastener from the opening when the protrusion is aligned with the first direction.

2. The control box cover assembly of claim 1 further comprising a wave washer installed on the shaft and positioned between the head and the latch.

3. The control box cover assembly of claim 1, wherein the opening comprises a circular shape with a slot extending outwards from the circular shape.

4. The control box cover assembly of claim 1, wherein the protrusion comprises a pin inserted in an opening formed through the shaft, the pin extending radially outward from the shaft in two directions.

5. The control box cover assembly of claim 4, wherein the pin comprises a spring pin.

6. The control box cover assembly of claim 1, wherein the latch is integral with the respective side panel.

7. The control box cover assembly of claim 1, wherein the latch comprises a second opening formed therein having a circular shape.

8. The control box cover assembly of claim 1, wherein the side panel coupled to the latch is a bottom side panel.

9. The control box cover assembly of claim 1, wherein the fastener comprises a rivet.

10. A method of fabricating a locking mechanism for a control box, the method comprising:
    providing a control box cover comprising a front panel coupled to a plurality of side panels, with a bracket coupled to a respective side panel and extending outwards therefrom;
    piercing an opening through the bracket, the opening having a first direction longer than a second direction;
    providing a fastener comprising:
       a shaft having a first end and a second end;
       a head coupled to the first end; and
       a protrusion extending radially outwards from the shaft proximal the second end, the protrusion configured to hold the fastener within the opening when the protrusion is aligned with the second direction and release the fastener from the opening when the protrusion is aligned with the first direction;
    aligning the protrusion of the fastener with the first direction of the opening; and inserting the fastener into the opening while the protrusion of the fastener is aligned with the first direction of the opening.

11. The method of claim 10 further comprising:
providing a control box comprising a back panel coupled to a plurality of side panels, with a bracket coupled to a respective side panel and extending outwards therefrom, the bracket having an opening formed therein having a first direction longer than a second direction;
positioning the control box cover in relation to the control box so that the opening of the control box cover bracket aligns with the opening of the control box bracket;
aligning the protrusion of the fastener with the first direction of the opening of the control box bracket;
inserting the fastener into the opening of the control box bracket while the protrusion of the fastener is aligned with the first direction of the opening of the control box bracket; and
upon insertion of the fastener into the opening of the control box bracket, rotating the fastener such that the protrusion of the fastener is not aligned with the first direction of the opening of the control box bracket, so as to couple the control box cover to the control box.

12. The method of claim 10, wherein piercing the opening comprises stamping an opening in the bracket using a stamping press.

13. The method of claim 10, wherein the fastener comprises a rivet having an opening formed through the shaft, and the protrusion comprises a pin inserted in the opening formed through the shaft so that the pin extends radially outward from the shaft in two directions.

14. The method of claim 13 wherein the opening of the bracket comprises a circular shape with a slot extending outwards from the circular shape, with the pin of the rivet being aligned with the slot so as to allow for inserting of the rivet into the opening of the bracket.

15. The method of claim 10 wherein inserting the fastener into the opening comprises tilting the fastener toward the opening of the front bracket while aligned with the first direction thereof such that an end of the protrusion opposite the opening clears the circular opening of the bracket as the fastener is inserted into the opening.

16. An electrical enclosure comprising:
an enclosure box for receiving electrical components therein, the enclosure box comprising a bracket extending outwards therefrom;
a front cover securable to the enclosure box, the front cover comprising a bracket alignable with the bracket of the enclosure box;
an opening formed in each of the brackets of the enclosure box and front cover, each opening comprising a circular opening having a notched aperture formed on one side thereof that extends outwards from the circular opening; and
a locking rivet assembly coupling the bracket of the front cover to the bracket of the enclosure box, the locking rivet assembly being insertable into the openings of the brackets when aligned with the notched apertures of the openings.

17. The electrical enclosure of claim 16, wherein each locking rivet assembly comprises:
a rivet including a shaft and a head, the shaft having an opening formed therein proximal to an end opposite the head;
a washer installed on the shaft; and
a spring pin inserted into the shaft opening, the spring pin having a first end extending outwards beyond the shaft in a first direction and a second end extending beyond the shaft in a second direction;
wherein the washer is positioned between the head and the spring pin.

18. The electrical enclosure of claim 17, wherein the locking rivet assembly is insertable into the openings of the brackets when the spring pin is aligned with the notched apertures of the openings and, upon insertion of the locking rivet assembly into the openings, secures the brackets together when the spring pin is askew from the notched apertures.

19. The electrical enclosure of claim 16, wherein each of the brackets on the front cover and the enclosure box include a second opening formed therein having a circular shape.

20. The electrical enclosure of claim 16, wherein the electrical enclosure comprises one of a NEMA Type 1, Type 2, Type 3, or Type 4 enclosure.

* * * * *